UNITED STATES PATENT OFFICE.

NEIL McCALLUM, OF PHILADELPHIA, PENNSYLVANIA, ASSIGNOR, BY MESNE ASSIGNMENTS, TO THE LEEDS MANUFACTURING COMPANY, OF BROOKLYN, NEW YORK.

COMPOSITION TO BE USED AS A PAINT OR DYE.

SPECIFICATION forming part of Letters Patent No. 283,265, dated August 14, 1883.

Application filed September 5, 1882. (Specimens.)

*To all whom it may concern:*

Be it known that I, NEIL McCALLUM, a citizen of the United States, residing at Germantown, in the county of Philadelphia and State of Pennsylvania, have invented a new and useful Composition of Matter to be Used as a Paint or Dye, of which the following is a specification.

The nature of my composition and the method or process of preparing the same are as follows: I take five parts of picric acid and thoroughly mix with three parts of flavine. To this compound I add twelve parts of nitric acid of 36° strength, Baumé. The resulting compound is then slowly boiled until the composition is evaporated to complete dryness. The resulting compound is a yellow dye, producing an unusually fast and permanent color, called "echurine."

The object of evaporating the flavine and picric acid together with nitric acid, rather than first forming the compound which is hereinafter designated "nitro-flavine," and then using with picric acid, is that a more perfect mixture is produced by the method of evaporation and the resulting dye-stuff is more economically and conveniently manufactured.

The influence of the picric acid: The evaporation of picric acid, together with flavine and nitric acid, has no chemical influence on the resulting dye, as the picric acid can be separated unchanged from the echurine; but the advantage of the procedure stated in this specification is twofold: First, an intimate mediate mixture of the nitro-flavine with the picric acid is thereby effected more perfectly than can be done by any mechanical means; and, second, a mass is obtained which can be easily removed from the vessel in which the operation is conducted.

The influence of the nitric acid: The chemical change which occurs when nitric acid is added to flavine and picric acid is found in a very great resulting increase of temperature and the evolution of dense fumes of nitrous acid. Flavine, when simply treated with nitric acid, undergoes an entire chemical change, as is shown by the increase of temperature and the evolution of nitrous fumes. The body formed, in fact, is a nitro derivative of flavine, and is best distinguished under the name of "nitro-flavine." It gives an entirely different dye-stuff from picric acid, which dyes silk of a greenish-yellow color, while nitro-flavine dyes it of a salmon color; and when the nitro-flavine is added to picric acid in the manner described in the patent the resulting dye-stuff dyes the silk of the color of echurine. The body resulting from the treatment of flavine with nitric acid and subsequent evaporations is a nitro compound, (nitro-flavine,) and differs in every respect from the original body. Besides the nitro-flavine, however, a small amount of the flavine undergoes decomposition by the action of the nitric acid, and a minute amount of picric acid is produced at the same time. Neither oxalic acid nor guercetine were produced, as appears by a further examination of the bodies resulting from the action of nitric acid on the flavine. The dyeing properties of the compound produced by the action of the nitric acid on the flavine are due to nitro-flavine and not to guercetine, as is shown by the absence of guercetine. The action of the nitric acid also is to increase the solubility of the compound, which appears from the fact that, while flavine is very slightly soluble in water, echurine is almost entirely so. There is no free nitric acid in the compound when prepared according to the specification, and the mass is evaporated to complete dryness.

As to the color of the dye: The color of the dye-stuff produced by the evaporation of nitric acid, picric acid, and flavine in the manner hereinbefore described will vary between the salmon color due to nitro-flavine and the particular tint of yellow due to picrid acid, according to the relative amounts of flavine, picric acid, and nitric acid originally employed and the thoroughness with which the chemical change due to evaporation to dryness is brought about. In case any flavine escapes conversion by nitric acid into nitro-flavine by the first evaporation, it is more completely changed by a second evaporation, and the resulting dye has a corresponding difference of tint, due to the larger percentage of nitro-flavine. Under the name "echurine" all these various shades of color, varying from salmon to greenish yellow, and produced in the manner set forth in the patent from various proportions of nitric acid, picric acid, and flavine, are intended to be claimed and described.

In no case is it intended to claim the use of picric acid alone, or of flavine or nitro-flavine alone, but the dye-stuff herein designated as "echurine," and produced of various tints of color, when a mixture of flavine and picric acid is evaporated to dryness with nitric acid, in the manner set forth in the patent.

What I claim, and desire to secure by Letters Patent of the United States, is—

The hereinbefore-described composition of matter to be used as a dye, consisting of nitric acid, picric acid, and flavine, combined as hereinbefore set forth.

Dated July 7, 1882.

NEIL McCALLUM. [L. S.]

Witnesses:
A. MEINCKE,
CHARLES H. WEISS.